US012072192B2

(12) United States Patent
Van Der Heijden et al.

(10) Patent No.: US 12,072,192 B2
(45) Date of Patent: Aug. 27, 2024

(54) SYSTEM AND METHOD FOR GEOMODELLING AND PATHFINDING

(71) Applicant: UNL NETWORK B.V., Amsterdam (NL)

(72) Inventors: Xander Van Der Heijden, Singapore (SG); Jake Doran, Amsterdam (NL); Eamonn McEvoy, Amsterdam (NL); Emre Turan, Amsterdam (NL)

(73) Assignee: UNL Network B.V., Amsterdam (NL)

( * ) Notice: Subject to any disclaimer, the term of this patent is extended or adjusted under 35 U.S.C. 154(b) by 215 days.

(21) Appl. No.: 17/866,416

(22) Filed: Jul. 15, 2022

(65) Prior Publication Data

US 2023/0015235 A1 Jan. 19, 2023

Related U.S. Application Data

(60) Provisional application No. 63/222,146, filed on Jul. 15, 2021.

(51) Int. Cl.
*G01C 21/20* (2006.01)
*G01C 21/00* (2006.01)

(52) U.S. Cl.
CPC .......... *G01C 21/20* (2013.01); *G01C 21/383* (2020.08); *G01C 21/3881* (2020.08)

(58) Field of Classification Search
CPC ... G01C 21/20; G01C 21/383; G01C 21/3881
See application file for complete search history.

(56) References Cited

U.S. PATENT DOCUMENTS

| 8,694,603 | B2 | 4/2014 | Brobst et al. |
| 9,535,927 | B2 | 1/2017 | Bursey |
| 9,582,826 | B2 | 2/2017 | Calman et al. |
| 10,672,063 | B2 | 6/2020 | Ward et al. |
| 2003/0176986 | A1 | 9/2003 | Dietsch et al. |
| 2009/0043504 | A1 | 2/2009 | Bandyopadhyay et al. |
| 2020/0159701 | A1 | 5/2020 | Subramanian et al. |

FOREIGN PATENT DOCUMENTS

EP 2817659 B1 5/2018

OTHER PUBLICATIONS

"Geohash," Wikipedia, <https://en.wikipedia.org/wiki/Geohash#References>, pp. 1-11.
(Continued)

*Primary Examiner* — Mathew Franklin Gordon
(74) *Attorney, Agent, or Firm* — IP AUTHORITY, LLC; Ramraj Soundararajan

(57) ABSTRACT

The indoors and outdoors are mapped into a grid comprised of cells using geohashing, wherein buildings, solid structures, and walkways are separately rendered and incorporated into the digital computer implementation, the size of each cell being indicative of the physical dimensions. Each cell has associated location-based static and temporal data that represent some aspect of the corresponding real-life representation of the cell, resulting in large amount of well-structured and useful data. A key method of this invention is an adaptation of fast pathfinding using cell-based vector field algorithm that is used in interactive computer gaming in virtual environments.

17 Claims, 10 Drawing Sheets

(56) References Cited

OTHER PUBLICATIONS

Jansen et al., "Direction Maps for Cooperative Pathfinding," Proceedings of the Fourth Artificial Intelligence and Interactive Digital Entertainment Conference, 2008, 4(1), pp. 185-190.
Durant, "Understanding Goal-Based Vector Field Pathfinding," <https://gamedevelopment.tutsplus.com/tutorials/understanding-goal-based-vector-field-pathfinding-gamedev-9007>, Jul. 5, 2013, pp. 1-11.
Butler et al., "The GeoJSON Format," Internet Engineering Task Force (IEFT) RFC 7946, Aug. 2016, pp. 1-28.
"Indoor Mapping Data Format (IMDF)—Overview," <https://register.apple.com/resources/imdf/, Oct. 19, 2021, v1.0.0, pp. 1.
"Indoor Positioning System (IPS)," Wikipedia, <https://en.wikipedia.org/wiki/indoor_positioning_system#References>, pp. 1-15.

|   |   |   |   |   |   |
|---|---|---|---|---|---|
|   |   |   |   |   |   |
|   |   |   |   |   |   |
|   |   |   |   |   | 7 |
|   |   |   |   | 7 | 6 |
|   |   |   | 7 | 6 | 5 |
|   |   | 7 | 6 | 5 | 4 |
|   | 7 | 6 | 5 | 4 | 3 |
| 7 | 6 | 5 | 4 | 3 | 2 |
| 6 | 5 | 4 | 3 | 2 | 1 |
| 5 | 4 | 3 | 2 | 1 | G=0 |
| 6 | 5 | 4 | 3 | 2 | 1 |

FIG. 1

SYSTEM AND METHOD FOR GEOMODELLING AND PATHFINDING

RELATED APPLICATION

This application claims the benefit of provisional application 63/222,146 filed Jul. 15, 2021.

BACKGROUND OF THE INVENTION

Field of Invention

The present invention is a system for constructing a cell-based digital representation of indoors and outdoors to store information associated with the location for applications such as asset management, data marketplace, and runtime pathfinding.

Discussion of Related Art

Any discussion of the prior art throughout the specification should in no way be considered as an admission that such prior art is widely known or forms part of common general knowledge in the field.

Destinations are represented by street addresses and/or location names fixed on an outdoors' map. Although temporal events such as traffic accidents, road closures, and congestions must be accounted for when the shortest path is determined, the graph (node and link) topologies (e.g., addresses and roads on the map) are fixed. Minor topological changes such as new buildings, new roadways, store closures, etc., occur, but these are infrequent. The traffic events that are temporal only change the weight of a link in the graph during real-time pathfinding. Thus, the route from a traveler to the destination only needs to consider the traveler's location and link weights as variables. Similarly, the routes are also fixed when considering airport, mall, or campus maps since the venues are known a-priori. Therefore, indoor and outdoor modeling, used primarily for pathfinding applications in the prior art, are designed by the principle of fixed map/topological data.

In stark contrast, some data associated with locations are highly temporal. For example, in a large store (e.g., Target) or a warehouse (e.g., Amazon) the item locations on the floor plan change rather frequently. Runtime computation of the shortest path from a person's current location towards an item, for example, becomes much more time-consuming compared to outdoors pathfinding because nodes (signifying item locations) are not fixed.

Simple pathfinding applications on mobile phones would be useful to aid shoppers in conveniently finding locations of items without needing assistance from store employees. Such pathfinding applications also aid warehouse workers in quickly locating items for asset tracking, packaging, and shipping. The pathfinding algorithm must be efficient enough to make a fast route determination by first determining where the item is in the store at that time, constructing the dynamic topology of the graph, and finally determining the best path in real-time.

First step is developing a database to store all the items in the store and all feasible item locations. An Indoor Positioning System (IPS) (see "Indoor Positioning System (IPS)," https://en.wikipedia.org/wiki/Indoor_positioning_system#References) and short-distance wireless communications such as Bluetooth, Wi-Fi, and Li-Fi that are well known in the prior art can be used. An item's location can be described in terms of indoor structures such as floor, room, partition, aisle, rack, shelf, table in a database, or by a location index. Item location update operation must be performed whenever the location of the item changes. This update involves deleting a reference for the item indicating a past location index in the database and adding a new reference.

A venue can be digitally mapped using various techniques. The simplest technique is to create a grid comprised of cells wherein a cell is a polygon. According to the first aspect of this invention, the grid is created using Geohashing (see Geohash, https://en.wikipedia.org/wiki/Geohash#References) that is used to encode geographic coordinates (latitude and longitude) into a short string of digits and letters (known as geohash) using base-32 alphabet encoding (characters can be 0 to 9 and a to z, excluding 'a', 'I', 'l', and 'o'). The geohash level 1 divides the world into 32 cells where each cell is defined by the geohash of length 1. The geohash level-1 cell is then divided into 32 cells. Each cell is defined by an area that has a geohash of length 2 and so on. The more characters in the geohash string, the smaller the cell and the more precise the location. While a level 1 cell is 5000 km by 5000 km, a level 9 cell is only 5 m by 5 m. The string length of a geohash represents its level. There is no limit or maximum geohash length, but for most human-scale geospatial use, the longest useful hashes are 12 characters. The lower level, of shorter hashes, are called parents, while the longer hashes, contained within, are called children.

Using a grid-based model with geohashes on an indoor or outdoor area brings many advantages. First, each geohash is globally unique. Simply inspecting the geohash, one can tell the exact location and physical size of the indoor cell (country, city, street, store, etc.) without needing to store cumbersome data such as the latitude and longitude. Second, many new applications (business, demographic, social, retail-centric, or other) will emerge that leverage the seamless merger of indoor and outdoor representations. Third, geohashes are hierarchical, which creates a hierarchical way of storing and abstracting data associated with the cell and working on more (or less) detailed information. Proximity searches are quick by simply inspecting the geohash. Finally, each cell represents a real-life object. The geohash can be used as an index to store map and non-map-related cell-specific static, dynamic, and location-based information. Even access rights to that data can be stored in association with the geohash. In summary, an embodiment of this invention creates a uniformly modeled and seamlessly integrated indoor and outdoor cell-based grid, wherein each cell contains much more than simply map information, and hence establishes a true digital twin of the world that changes constantly.

According to the first aspect of this invention, the geohash is extended to represent floor and height information. Note that geohash in the prior art is an index for a 2D (x and y axes) representation. For floor and height indications, special symbols, '#' and '@' are chosen. For example, the level 9 geohash u173zyxe2 according to the prior art can be extended as follows:

u173zyxe2#221 => indicates that the cell is at a height of 221 cm.

u173zyxe2@2 => indicates that the cell is on the 2nd floor.

A negative floor value indicates under-ground.

The latter is used more often in the system of the present invention, as the height often refers to building height, and floor indication is agnostic of the actual, possibly variable height of each floor. The cm option can be used for more specific cases, where precise height is important, such as rack height. These extensions allow geohashes to essentially represent 3D cells (using x, y, and z axes). Special symbols other than '#' and '@' can also be used. Without loss of generality, information other than height and floor level can be parsed from the geohash using other special symbols.

According to the second aspect of the present invention, a pathfinding algorithm is tailored for indoors and outdoors that leverages the hierarchical cells and geohashes of multiple floors and heights. The indoor areas are populated by structures (walls, floors, racks, etc.). Similarly, urban areas are densely populated by human-built structures such as houses, commercial buildings, bridges, railways, underground passages, etc. Therefore, the pathfinding application must factor in presence of structures and yet must run fast. Interactive gaming applications model virtual environments using a grid. For runtime pathfinding, they rely on hierarchical cell-based vector field pathfinding algorithm (see Jansen et al., "Direction Maps for Cooperative Pathfinding," and Durant, "Understanding Goal-Based Vector Field Pathfinding,") that has proven to have many advantages over traditional shortest-path algorithms (such as Dijkstra) in environments with many obstacles. Although the algorithm does not use geohashes, it is ideally tailored for a grid, and therefore, a perfect match to cell-based indoor models of this embodiment. Runtime to path computations using a node-link model are cumbersome and therefore not fast enough in areas with many obstacles and variable topologies. In one method of the present invention, the cells corresponding to structures are deleted from the grid using a computer implementation, to create a representation of clear passages (referred to as the walkway grid). Thereafter, the heatmap and vector field are generated for optimal pathfinding on walkways as it is done in computer games. Multiple floors and different height objects are easily modeled. By doing so, the pathfinding algorithm becomes applicable to single-floor, multi-floor, and underground surroundings.

Modeling and rendering techniques for geo structures have been evolving in the prior art. For example, GeoJSON specified in RFC 7946 (see RFC 7946, "The GeoJSON Format,") by Internet Engineering Task Force (IEFT) teaches how to specify an indoor object with its geo-location. Similarly, Indoor Mapping Data Format (IMDF) (see "Indoor Mapping Data Format (IMDF)," version 1.1.0, 09-09-2020) developed by Apple Inc. teaches ways to model indoor map components using polygons, points, and lines. The IMDF further provides templates for attributes of indoor objects. These techniques enable superimposing digital models of indoor structures onto the grid. Furthermore, enriching the cells with location-based static and temporal data can pave the way for various new applications.

Several recent references are found on pathfinding indoors. For example, US20090043504 A1 discloses a system and method for generating an indoor map by locating, tracking, and/or monitoring the status of personnel and/or assets. U.S. Pat. No. 10,672,063 B2 provides a system for users to find the location of and best route to an item in a store using a mobile application. Although this patent describes routing, it does not describe with accurate and fine granularity the location information associated with items in the store is modeled, and how the item data is associated with location data. Similarly, U.S. Pat. No. 9,582,826 B2 describes an indoor pathfinding application on a user's mobile phone that operates on a shopping list. The product locations are provided (i) manually through a planogram, (ii) through crowdsources data provided by other users or the general public through tagging, or (iii) through RFID on each product. Patent application CA2824107A1 describes another pathfinding system that is integrated with a targeted message generation system wherein the message based on the user's profile is generated to the user viewing an item. The information stored in the pathfinding map is static. None of this prior art relies on a geomap.

There are several references on map generation for indoors. US2003176986 A1 discloses a wheeled mobile device for spatial data collection for use in creating floor plans, maps, and models of existing spaces. EP2817659B1 describes a method to develop a floor plan using a handheld wireless device by the user—as the user travels from the first location to a second location indoors and captures and marks lines of travel.

None of the cited prior art however describes (i) an efficient way of modeling the indoors and outdoors using a hierarchical cell structure, (ii) geohashing the grid to geo-accurately index cells including height and floor level, (iii) storing cell-specific static and temporal non-map information, and (iv) pathfinding by applying techniques used in interactive computer gaming applications that are suitable for cell-based digital maps.

Embodiments of the present invention are an improvement over prior art systems and methods.

SUMMARY OF THE INVENTION

In one embodiment, the present invention provides a runtime pathfinding method for determining the shortest path between a start point and end point in a geo grid of level-n comprised of cells, comprising the steps of: (a) determining, at runtime, a first child level cell associated with the start point; (b) determining, at runtime, a second child level cell associated with the end point; (c) determining, at runtime a first shortest path between the first child level cell associated with the start point and a first parent cell edge nearest to the start point; (d) determining, at runtime a second shortest path between the second child level cell and a second parent cell edge nearest to the end point; (e) extracting a pre-computed and cached shortest path between the first nearest parent cell edge and the second nearest parent cell edge; (f) constructing, at runtime, the shortest path between the start point and the end point by adding cell paths obtained in (c), (d) and (e); and (g) outputting the constructed shortest path between the start point and the end point In an extended embodiment, the method further comprises mapping of an area onto the geo grid of level-n by: (a) forming the level-n grid covering the area, where n>2, the forming comprising: (1) assigning a plurality of level-1 cells to cover the area, each level-1 cell in the grid indexed by a geohash of length 1; (2) assigning a plurality of level-2 (child) cells to cover each level-1 (parent) cell, each level-2 cell indexed by another geohash of length 2, and assigning a plurality of level-3 cells to cover each level-2 cell, each level-3 cell indexed by yet another geohash of length 3, wherein assigning in (2) is repeated, when necessary, until a level-n grid is formed; (b) storing map information associated with each geohash in the level-n grid; and (c) storing non-map information associated with each geohash in the level-n grid.

In another embodiment, the present invention provides a system comprising: (a) a first database storing first data mapping an area onto a level-n grid, where n>2, the level-n grid formed by (1) assigning a plurality of level-1 cells to cover the area, each level-1 cell in the grid indexed by a geohash of length 1; (2) assigning a plurality of level-2 cells to cover each level-1 cell, each level-2 cell indexed by another geohash of length 2, and assigning a plurality of level-3 cells to cover each level-2 cell, each level-3 cell indexed by yet another geohash of length 3, wherein assigning in (2) is repeated, when necessary, until a level-n grid is formed; (b) a second database storing map information associated with each geohash in the level-n grid; (c) a third database storing non-map information associated with each geohash in the level-n grid; and (d) a fourth database storing cached shortest paths between parent cell edges in the level-n grid.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 1 depicts an example of path distances (heatmap) on a grid comprised of cells according to the prior art.

Figure 2:
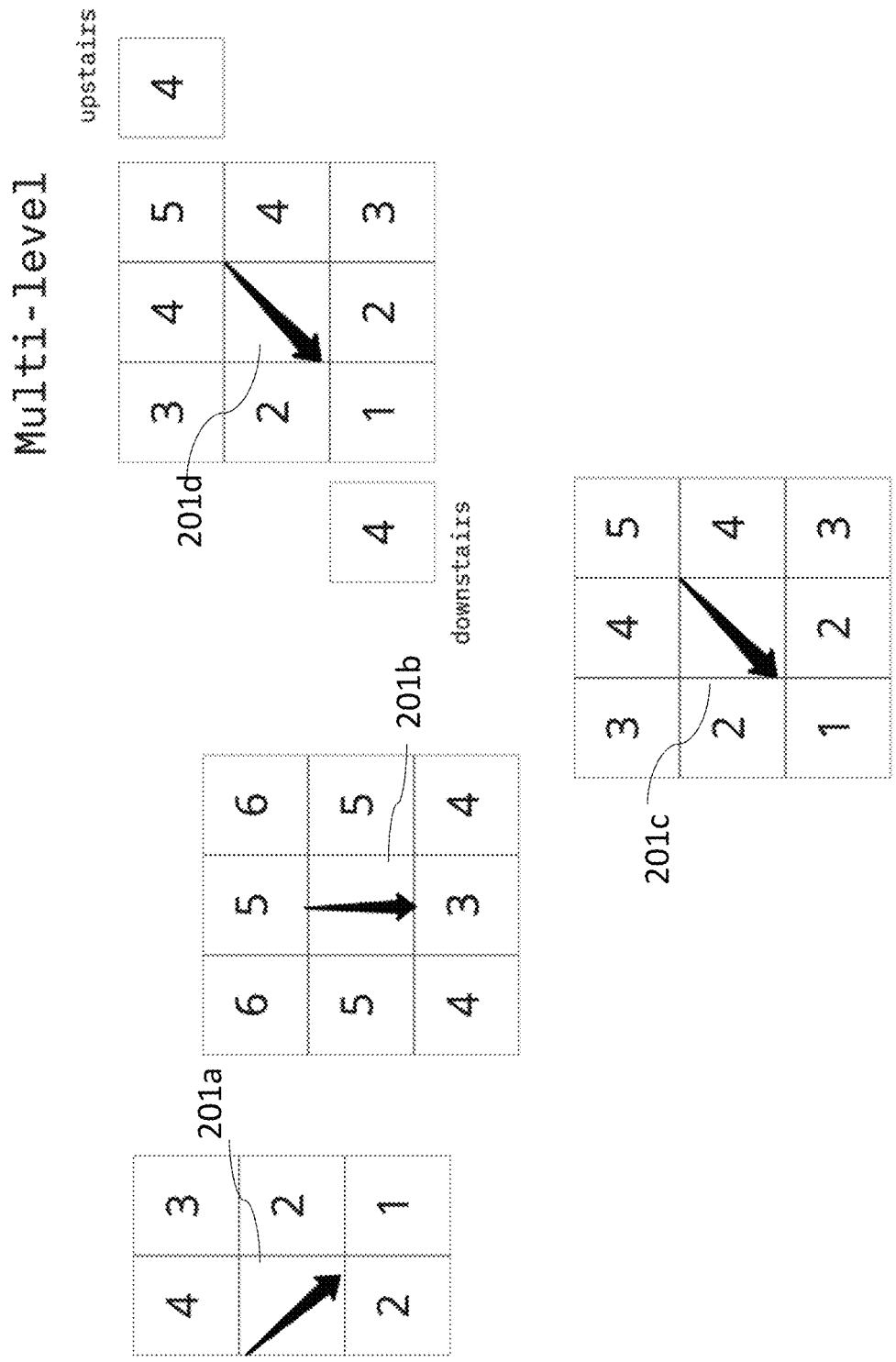
FIG. 2 depicts how vector directions are constructed on a vector field diagram according to the prior art.

Skilled professionals will appreciate that elements in the figures are illustrated for simplicity and clarity and have not necessarily been drawn to scale. Also, common but well-understood elements that are useful or necessary in a commercially feasible embodiment are often not depicted in order to facilitate a less obstructed view of these various embodiments of the present invention. Flowcharts and block diagrams in the Figures illustrate the functionality and operation of possible implementations of systems, methods, and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The first few figures are intended to describe the cell-based vector fields. Referring to FIG. 1, a simple exemplary grid is illustrated for the purpose of showing path distances from a so-called 'goal cell' labeled as G=0. From here on, each cell in the grid is labeled with its path distance towards the goal cell. Note that cells farther away from the goal cell have a higher path distance. Once these path distances are labeled, a heatmap of the grid is developed which can be visualized as a 3D map wherein x and y axes values are the cell location, and the path distance from the goal is the z-axis value. The heatmap assists determination of the length towards a goal cell from any cell of the grid. Therefore, in an n cell grid, there are $n^2$ possible goal cells and $n^2$ corresponding heatmaps. Once the heatmaps for all goal cells are created, the next step is determining on each heatmap which neighboring (local) cell to move towards to reach the goal cell, given that each neighbor cell has a different distance toward the goal cell. This step is known in the prior art as the vector field generation.

Figure 3:
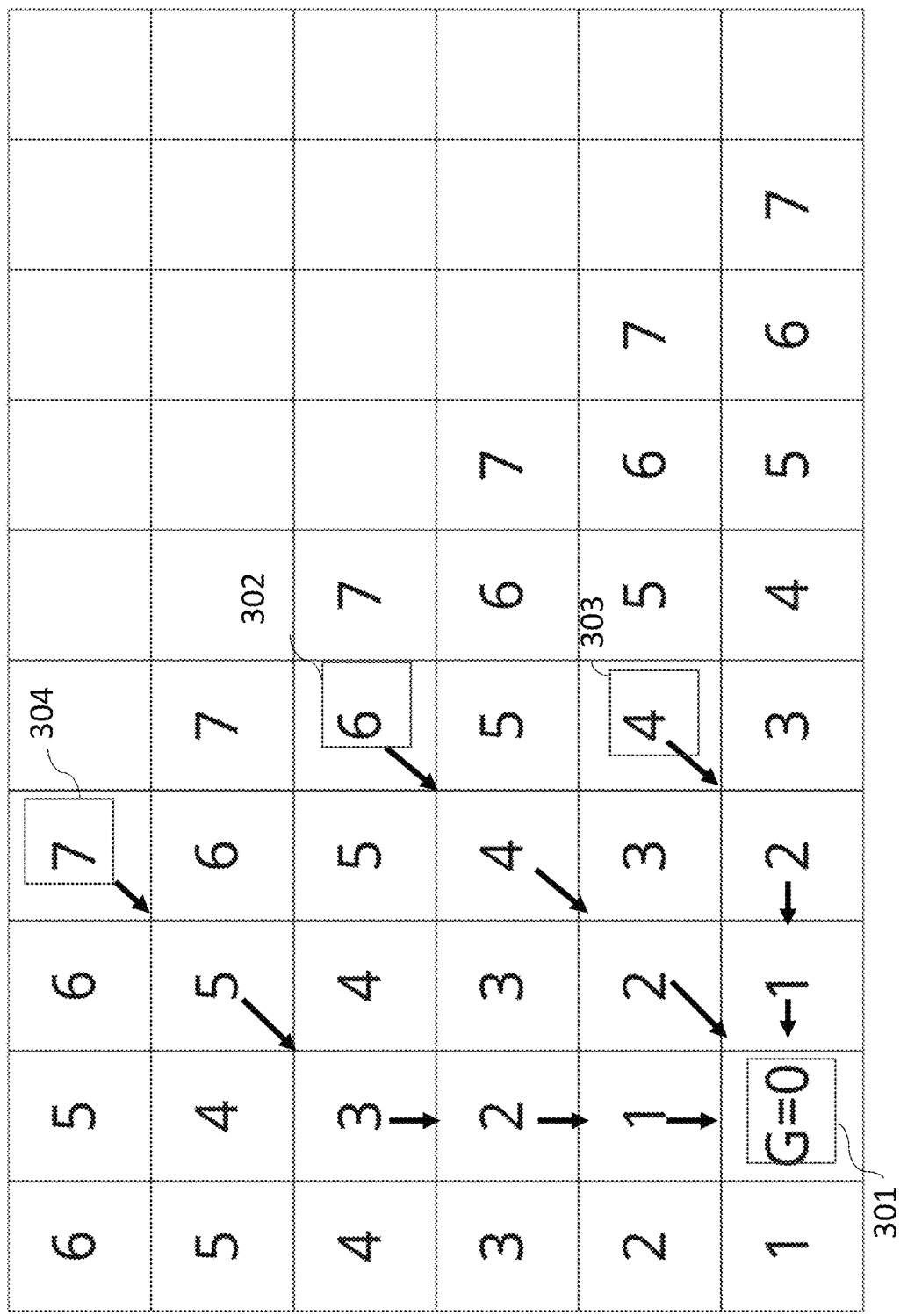
FIG. 3 illustrates optimal paths using heatmap and vector field according to the prior art.

Referring to FIG. 2, the vector (direction of movement) of cell 201a is diagonal towards the neighbor cell labeled with distance 1 since this is the cell with the shortest distance to the goal cell. The vector direction for cell 201b is downward since the neighbor cell labeled with distance 3 has the shortest distance to the goal cell. The vector direction for cell 201c is diagonal since the neighbor cell labeled with distance 1 has the shortest distance to the goal cell. This technique applies to a multi-floor grid configuration as illustrated in 201d wherein the vector points downward when the shortest path is downstairs. FIG. 3 shows the optimal paths from cells labeled 304, 302, and 303 towards the goal cell 301 using the heatmap and the vector field principles described above.

The techniques illustrated in FIGS. 1-3 are widely used in interactive computer gaming applications to calculate the shortest paths in runtime between moving game objects. Just as in real indoors, the simulated/virtual indoors has many obstacles. However, the grids used in gaming applications are synthetically created and designed for representing a virtual environment. In stark contrast, the hierarchical grid with multiple levels used in this embodiment has an actual physical context on the earth's surface. Cell-based vector fields can further be enriched with information stored in the cells, i.e., incrementing or decrementing a cell path distance based on some other information.

Figure 4:
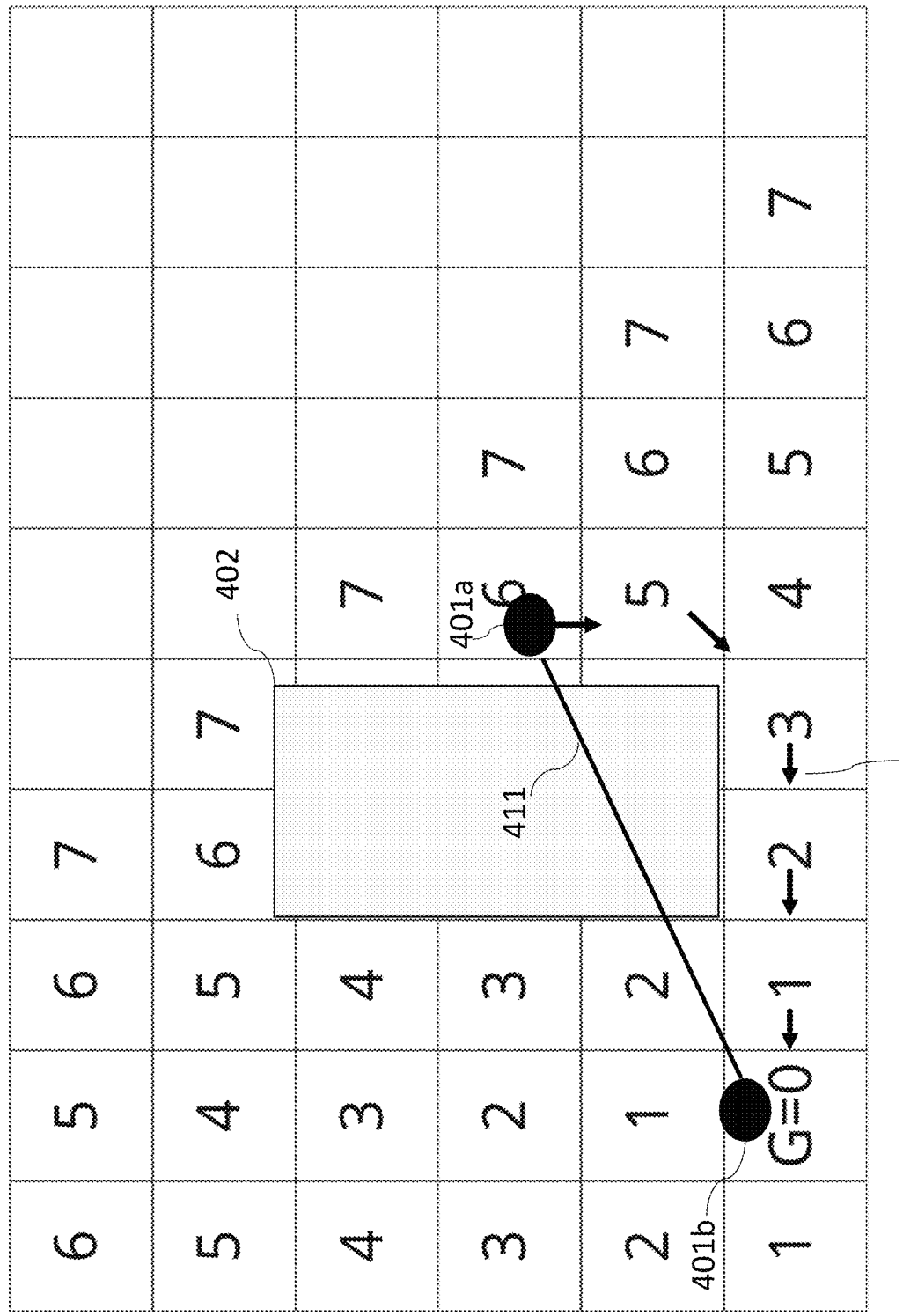
FIG. 4 illustrates the shortest paths according to prior art approaches.

FIG. 4 depicts a realistic map of a segment indoors wherein a solid (untraversable) structure 402 is placed in the room. The shortest distance between goal cell 401b (G=0) and cell 401a is line 411. Because there is a solid structure in the middle, this path is obviously not feasible. So, a path needs to be constructed around structure 402. The first step is to generate the heatmap of the walkway. The number on each cell along the walkway shows the path distance to the goal cell. Note that there are several possible paths between 401a and 401b, but the shortest path 403 (traced by arrows) obtained by applying the vector field approach described above is the only interest.

Once the vector field has been defined for all relevant cells in the grid, paths can then be quickly read from the graph by following the vector field. This process is very efficient but becomes unwieldy when n (the number of cells) is large, for example, in large indoor spaces or urban areas. To work around this issue, a technique called hierarchal routing is developed in the prior art, which leverages the parent-child relationship between cells using two or more grid levels.

Figure 5:
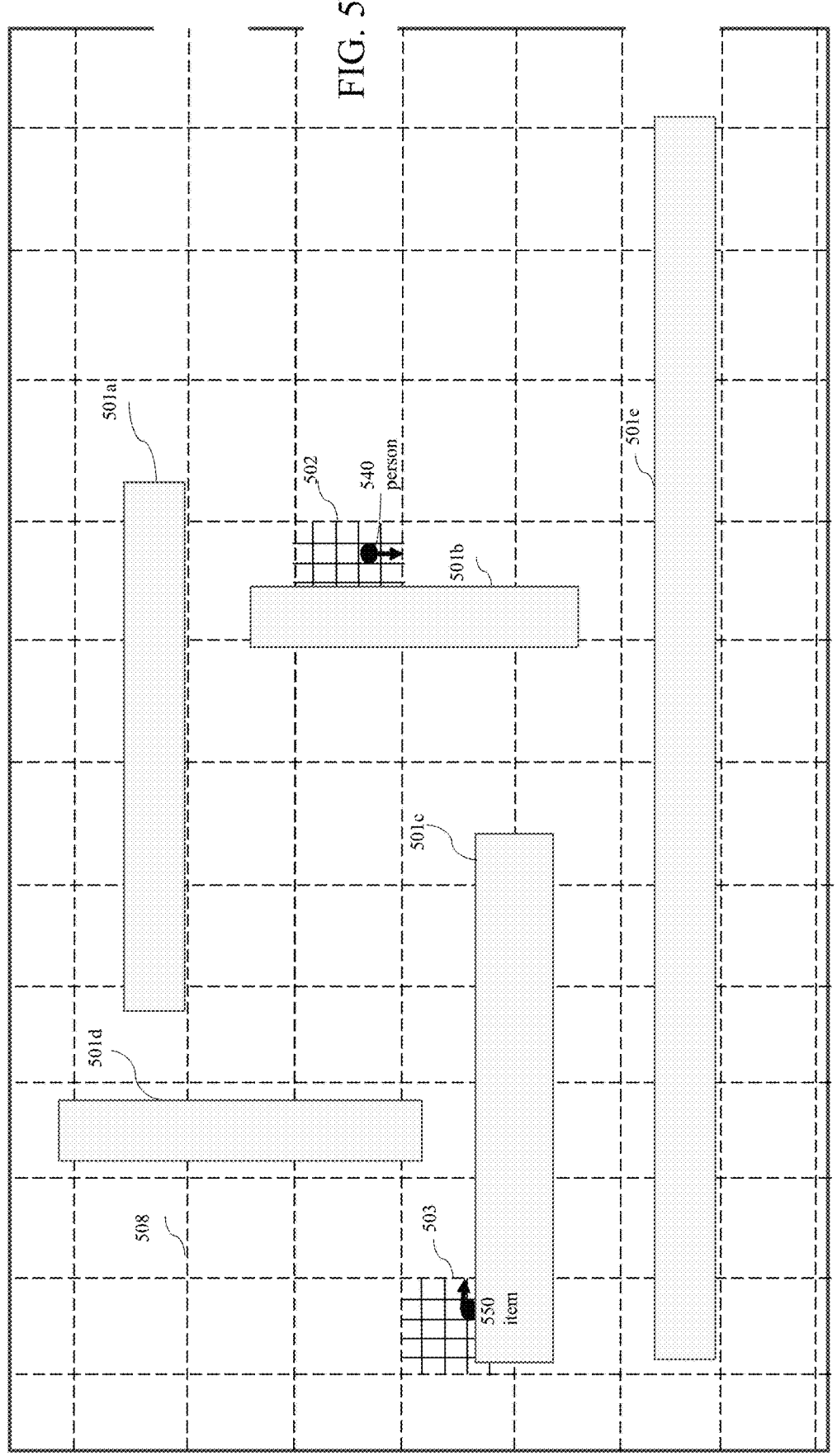
FIG. 5 depicts an example indoor map with two levels of geohashes according to the present invention.

Cell hierarchy enables cached optimal routes that are determined at a higher-level (parent) grid to cover long and well-known route segments. To explain this concept, a simple diagram of the indoors is illustrated in FIG. 5. Using the hierarchical geo-mapping approach, two levels of cells are illustrated. Parent-level cell 508 represents an area A (say, at level 9 geohash, A=4.77 m×4.77 m). Child-level cells 502 and 503 cover a highly granular and therefore much smaller area B (at level 10 geohash, B=1.19 m×0.596 m) where B=A/32. Child-level cells are preferred around structures/obstacles such as racks and shelves on which objects (such as merchandise) are placed to accurately pinpoint the location of the object. The pathfinding algorithm relies on a more detailed mapping of the immediate neighborhood of person 540, shown as child-level cells in 502 (not drawn to scale). There is a plurality of non-traversable structures labeled as 501a, . . . , 501e, which block the linear shortest distance between cells.

The mapping of an area using multiple geohash levels enables zooming into structures to view for example an object on the structure. Furthermore, by storing information associated with the cell's geohash, one can obtain important object information (name, category, manufacturer, category, price, reviews, expiration date, etc.) while viewing the object. Storing access rights along with object data associated with the geohash enables privacy and data security. Not only static information but certain temporal information can also be stored and viewed (e.g., counts such as the number of persons at a location at a time, measurements, weather). It is obvious to one skilled in the art to determine other types of data stored associated in a cell including people, merchandise, the Internet of Things, sensors, machinery, vehicles, hard structures made with wood, concrete, plastic or metal, walls, kiosks, racks, objects of art, tables, desks, chairs, sports equipment, staircases, elevators, walkways and all other objects of indoors that are not enumerated here. Said other types of data are static or dynamically varying, manually entered, or obtained from another remote or local computer system or database. Said other types of data may not be updated regularly, may be updated from time to time, periodically, or upon an event. A cell may have said data even when there is no object present in the cell.

In the first embodiment, the given space is pre-processed, first by dividing it into walkways contained within parent-level geohashes to enable hierarchal routing according to an aspect of the present invention. This representation is then used in non-real-time to compute shortest path routes between parent cell pairs (considering distances from all four edges of each parent cell) and to cache these routes. A graph database is used to store each parent cell, along with the shortest routes it has to all other (or selected) parent cells. The nodes of this graph represent the parent cells, and the lines that join them represent the shortest route across the parent cell structure between each node pair. These node clusters, processed from the parent cells, are then joined with their neighbors, together forming a grid of the whole space. Although a graph database provides an efficient representation, other types of databases can also be used.

If both start point and end point are variable and not on a parent cell edge, then the route can then be pieced from the following:
1. Determine in runtime the shortest route between the start point (on the start-parent) and its nearest parent-cell edge using its child-level map of the start-parent cell. This computation is performed on a small 32×32 grid, and therefore very quick.
2. Determine in runtime the shortest route between the endpoint (on the end-parent) and the nearest parent-cell edge using the child level map of the end-parent cell. This computation is performed on a small 32×32 grid, and therefore very quick.
3. Retrieve the cached shortest route across the parent level map between the start-parent and end-parent cells. No computation is required since the route is determined beforehand and cached.

Figure 6:
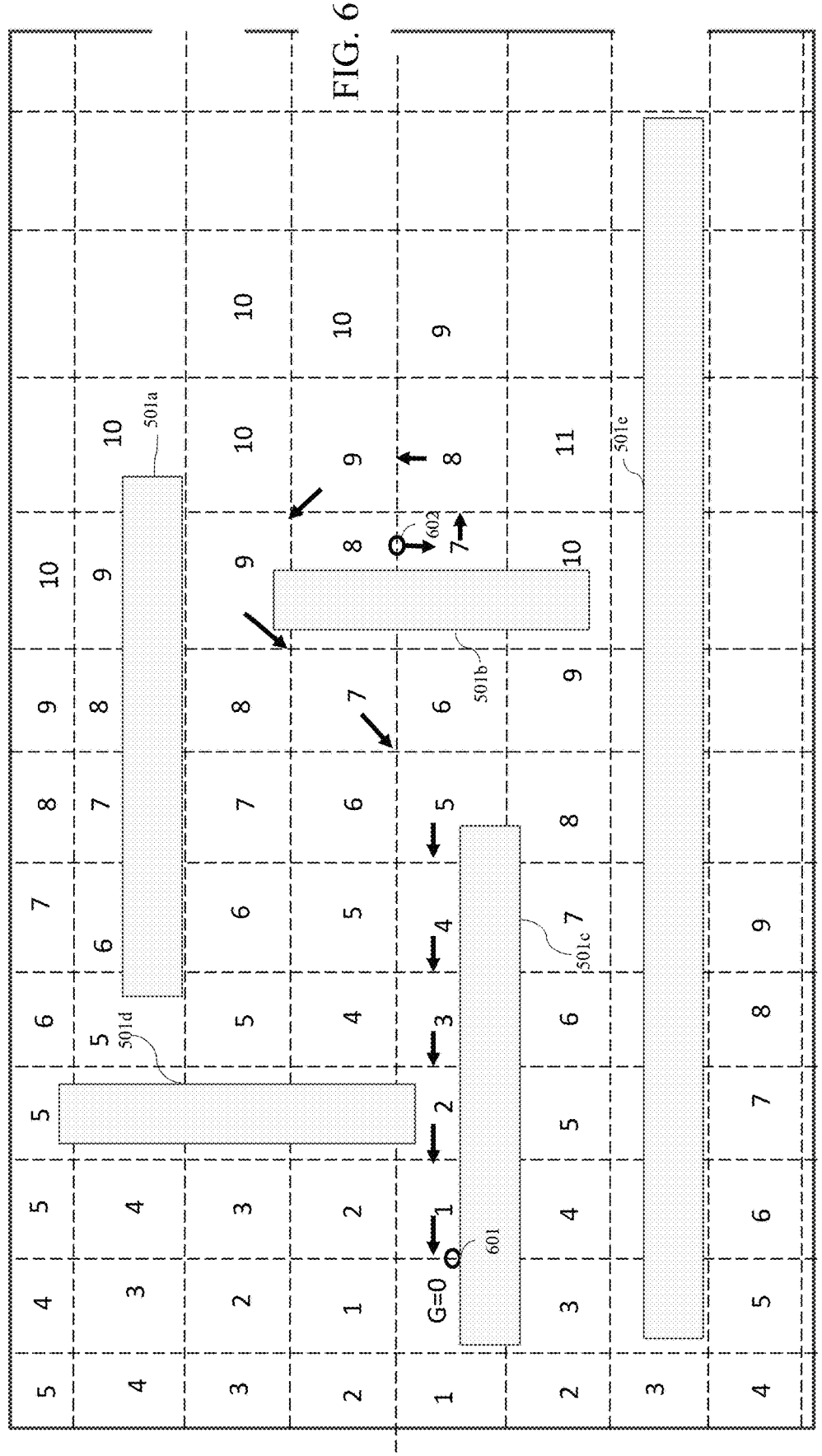
FIG. 6 depicts an optimal path on the walkway geomap according to the present invention.

To demonstrate the aforementioned steps, FIG. 5 illustrates person 540 (start point) moving towards item 550 (endpoint, G=0) on structure 501c. Cell 502 is the start parent cell. Cell 503 is the end parent cell. The arrow directions at the start and end points show the best vector field directions towards the corresponding nearest parent cell edges. In FIG. 6, edge 602 of parent cell 502 is obtained according to step 1 above. Similarly, edge 601 of parent cell 503 is obtained according to step 2 above. The shortest path between 601 and 602 is retrieved from the cache according to step 3, above. If the endpoint is readily located on a parent cell edge, then the route can be pieced as follows:
1. Determine in runtime the shortest route between the start point (on the start-parent) and its nearest parent-cell edge using its child level map of the parent cell only. This computation is performed on a small 32×32 grid, and therefore very quick.
2. Retrieve the cached shortest route across the parent level map between the start-parent and end-parent cells. No computation is required since this route is determined beforehand and cached.

Figure 7:
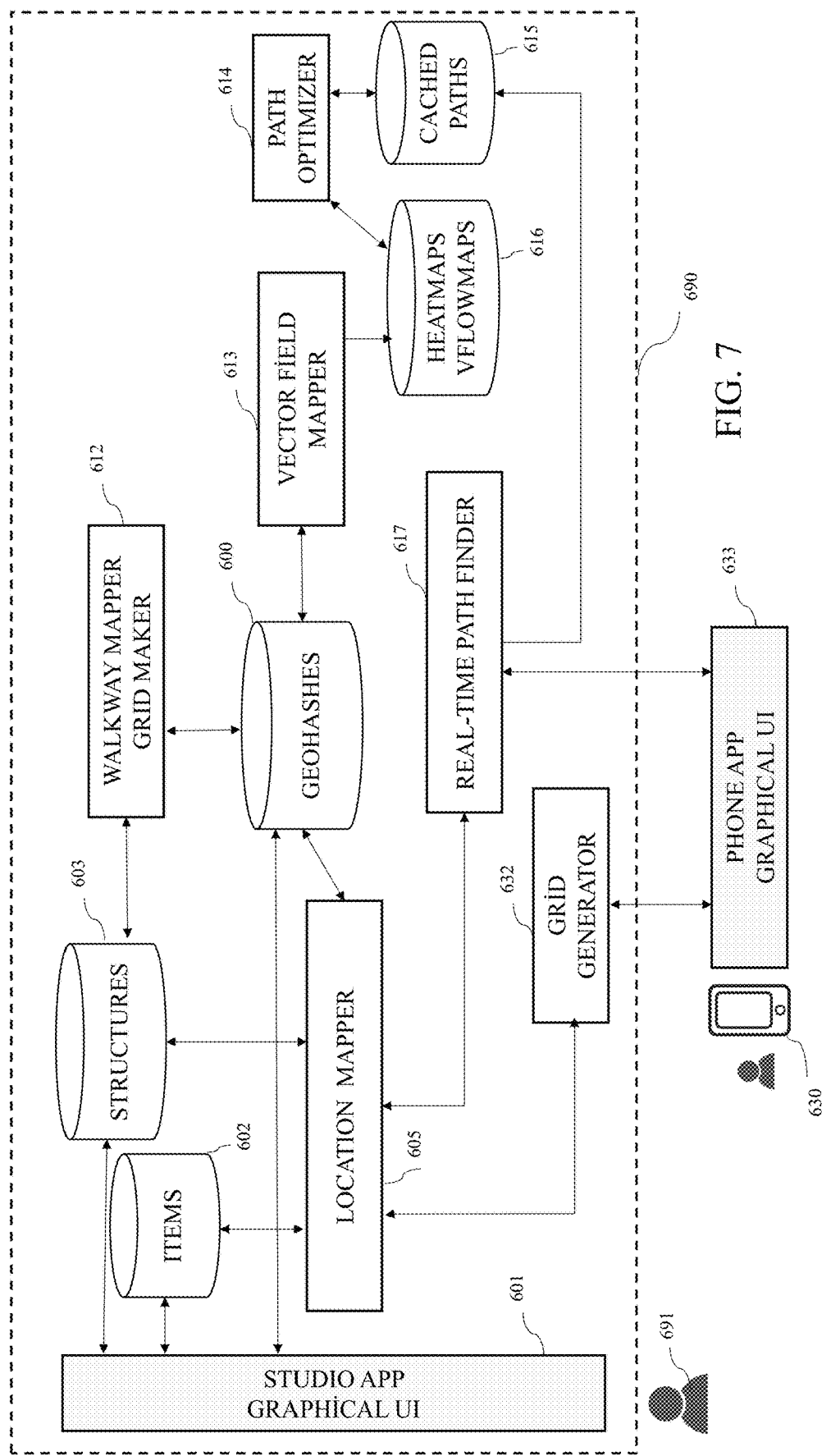
FIG. 7 depicts a high-level diagram of the components of an embodiment of the system of the present invention.

The second embodiment illustrated in FIG. 7 is a high-level block diagram of a computer implementation of the system of the present invention. Note that the diagram shows various databases and logic components implementable in software or hardware. Two separate subsystems are shown:
(i) Server subsystem 690 that maps the indoors into a multiple-level grid using geohashes, and stores associated data. This subsystem has several other components (a) studio application that generates indoors or outdoors grid, (b) heatmap and vector field generator, (c) parent-level path optimizer, and (d) real-time pathfinder.
(ii) Client subsystem 633 that is illustrated on a mobile smartphone. This application with a graphical user interface leverages the intelligence and data of subsystem 690 that models indoors or outdoors. An exemplary intelligent application is real-time pathfinder 617. However, many other intelligent applications (such as asset or people tracking) can leverage components of system 690 and offer different services to mobile user 630. Client subsystem 633 may also be on a stationary computer.

Various logical databases 600, 602, 603, 615, and 616 are shown in FIG. 7. These databases can be relational, hierarchical (e.g., LDAP), or graphical (e.g., NoSQL) depending on implementation. A single physical database or a plurality of physical databases may host these logical databases. The databases may be on a local computer, a remote computer, or in the cloud. The software programs can be written in any programming language such as C, C++, Java, or Phyton. The graphical user interface can be a touch screen, menu-driven and/or form-driven. Some software components may run on a custom application-specific integrated circuit (ASIC) or on general-purpose computer chips. All these variations of implementation are covered by this invention. The Client subsystem 633 is a downloadable application (e.g., from an App. Store or from a website).

An accurate model generation is a highly important first step. Studio Application UI 601 is a key component of invention and provides means to convert Building Information Model (BIM) and Computer-Aided Design (CAD) information of building or city plans into a detailed digital plan with relevant details such as locations of buildings, walls, concrete structures, and permanent fixtures of interest. This information must be accurately rendered. However, various systems for generating detailed digital plans for indoors and outdoors are available through many vendors in the market and are thus considered prior art. The key aspect of innovation in Studio App 601 is generating an accurate geogrid with a proper indication of floors and heights (a 3D grid). By mapping the geogrid, UI 601 generates a hierarchical map with multiple cell levels, say two levels with parent level (e.g., level 9) and lower level (e.g., level 9) geocells, creates geohashes for each cell, and pushes the geohashes into the geohash database. All objects are incorporated using GeoJSON objects stored in Structure Database 603 with their corresponding cell locations. For a multi-floor indoors, each floor is separately processed as described above, and the geohashes of cells are marked with an indicator of floor number to represent a layered geohash structure.

Only for the sake of simplification, the principles of this invention are mapped to the modeling of a warehouse or a store, hence the use of the term 'item' or 'items' as it is the relevant cell data in such a setting. In some other indoors or outdoors applications, there will be other cell-specific information that can't be described or classified as an item. With that understanding, items database 602 stores information about all items located in the store/warehouse. Items database 602 can be a separate inventory system database tracking inventory in the store/warehouse and located in another system or it can be a local copy. Indoor Structures database 603 stores digital rendering of all indoor or outdoor structures. Cells/Geohashes database 600 stores geohash information. Walkway Mapper 612 is an application that extracts only the walkway grids by removing structures from the grid. Location Mapper 605 maps items to geohashes and indoor structures. These are also stored in database 600. Vector Field Mapper 613 generates vector flow directions according to all goal cells located on the walkway grid. Path Optimizer 614 determines the shortest paths between all parent cell pairs on the walkway grid and stores them in Cached Paths 615 which may or may not be a graph database. All these components of subsystem 690 form the foundation for various possible real-time applications. The diagram may have omitted other components that an implementor may want to add, but the basic components described in subsystem 690 suffice to teach key aspects of the system of the present invention.

Exemplary application 632 generates the map of indoors upon request from Phone App 633 at different geohash levels. Real-Time Path Finder 617 calculates a path from user 630 to a selected item using cached paths and calculated path segments according to the method explained in the first embodiment. If mobile user 630 doesn't follow the optimal path, the Real-Time Path Finder 617 recalculates the path according to the current position of mobile user 630, the new start point being the current parent and child cells (neither cell being on the original optimal path) and displays the new path on the map.

It is obvious to one skilled in the art that the mapping of data to geohash with associated various static and temporal information applied here to a warehouse applies without any loss of generality to other types of stores, commercial or residential buildings, parking lots, urban outdoor venues, smart cities, etc.

Figure 8:
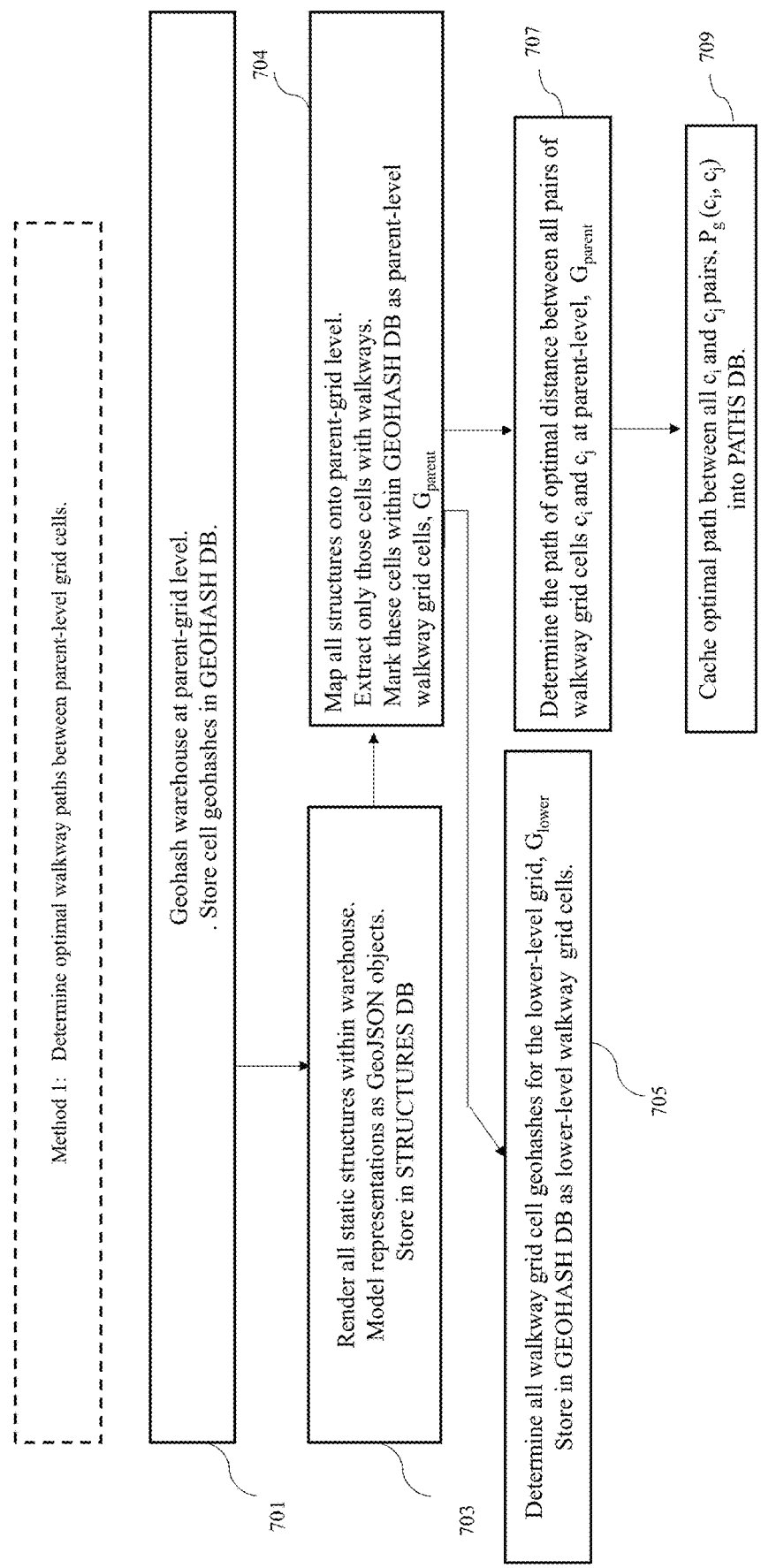
FIG. 8 depicts a flowchart of the first exemplary method of the present invention.

The flow chart of a method of the present invention is shown in FIG. 8. The method starts at step 701 wherein the geohashes are generated by Studio App 601 and stored in Geohash DB 600. A plurality of levels is used. In step 703, all static structures are rendered digitally as GeoJSON objects by Studio App 601 and stored in Structures DB 603. Since each GeoJSON object corresponding to a structure has coordinates as attributes according to GeoJSON, they can be easily mapped onto cells of indoor map in step 704. Furthermore, the parent cells corresponding to walkways are extracted and a map of walkways is created in step 704 along with the determination of corresponding heatmaps and vector fields using vector field mapper 613. The child-level cells may be needed for accurately overlapping the structures of uneven shapes onto the geogrid. The lower-level grid cells of the walkway are also marked in step 705. Although a two-level hierarchy is described, more or fewer levels may be used depending on many factors, such as the shape of the indoors, the shape and number of untraversable structures, and runtime and accuracy requirements. In step 707, the shortest paths between parent grid cells are computed using Path Optimizer 614 and stored in Cache Paths DB 615 in step 709.

Figure 9:
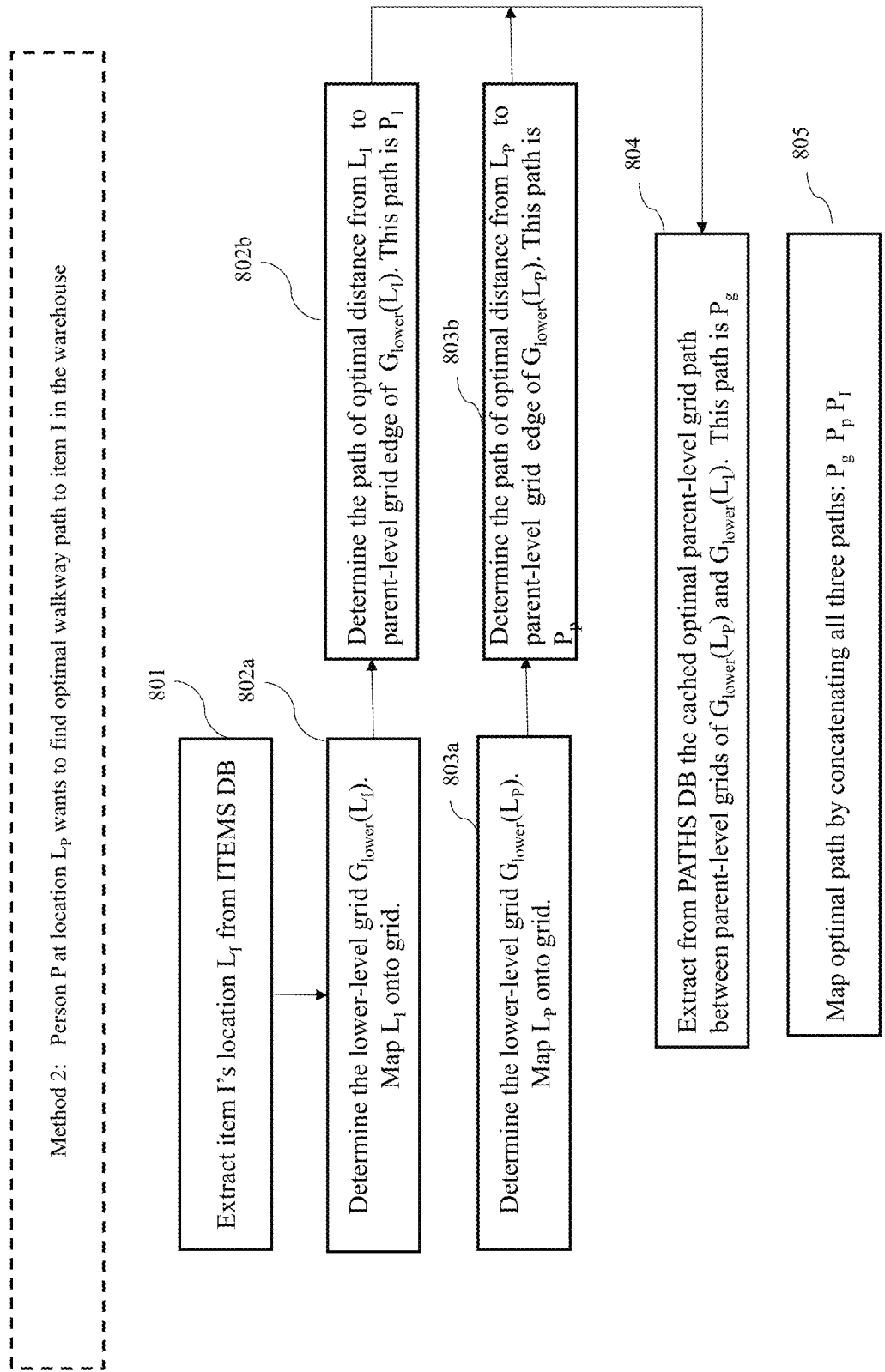
FIG. 9 depicts a flowchart of the second exemplary method of the present invention.

The flow chart of another method of invention executed by Real-Time Path Finder 617 is shown in FIG. 9. The scenario is finding the path from a shopper to an item in the store. Step 801 is extracting the item's location in the store and its mapping to the corresponding cell and hash. The item is mapped onto a lower-level cell in step 802a. The shopper is mapped onto a lower-level cell in step 803a, in parallel to step 802a or in sequence. In steps 802b and 803b, the optimal paths to the nearest parent edge are determined for the item and shopper, respectively. In step 804, the cached optimal path between corresponding parent cells is determined. The optimal path is then obtained in step 805 by concatenating these three paths.

Figure 10:
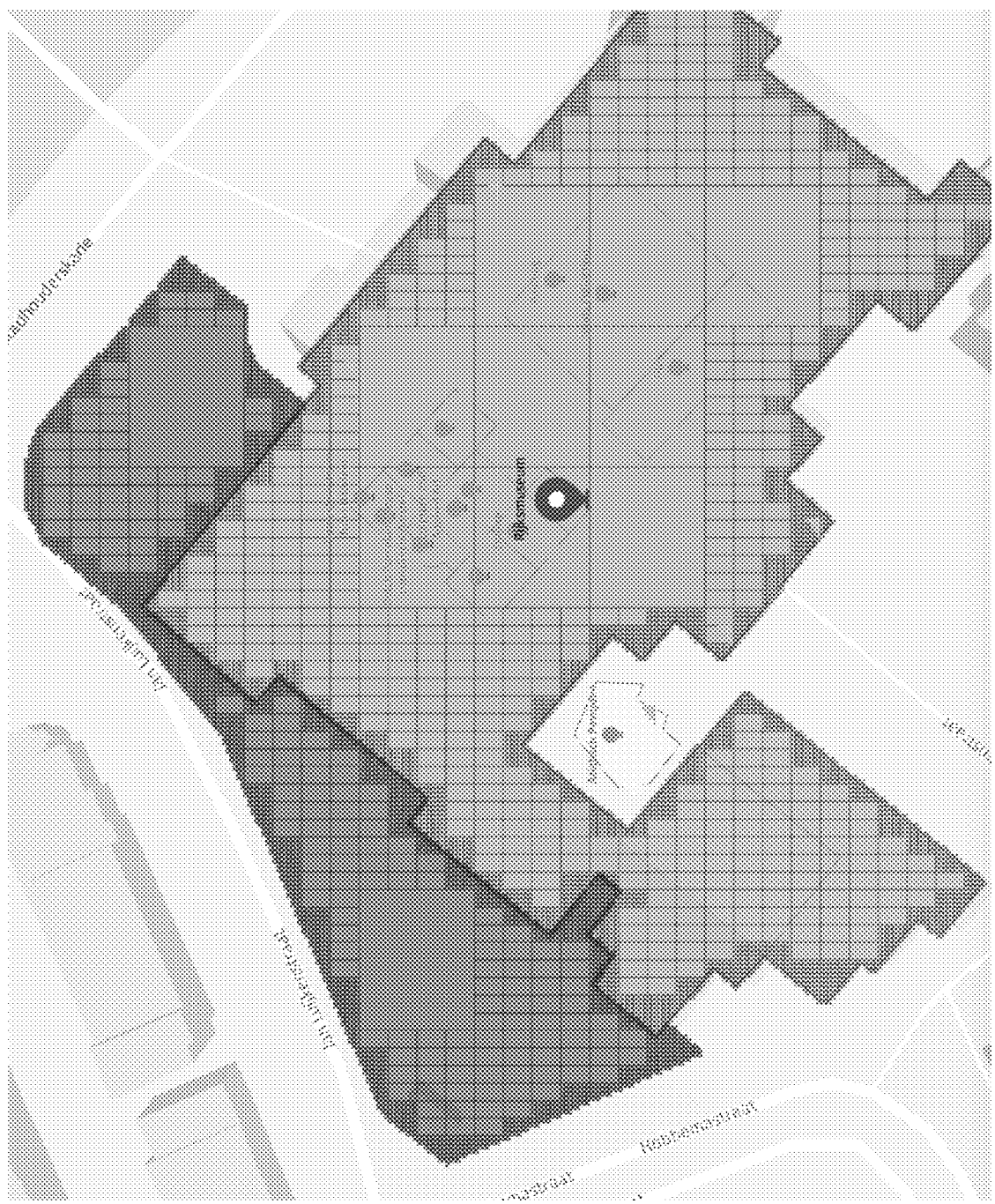
FIG. 10 depicts an example of walkway geogrids of an actual venue generated by Studio Application 601, a subsystem of the present invention.

FIG. 10 illustrates an exemplary rendering of an indoors using parent and child-level cells.

It is worthwhile to note that once the indoors grid is created, then it is possible to merge the grids of indoors and outdoors, thereby creating pathfinding applications that traverse both indoors and outdoors (e.g., parking lots). The merger of these two models also yields many new types of applications for users that can access information seamlessly across indoors and outdoors.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits.

The above-described features and applications can be implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general-purpose or special-purpose computer, including the functional design of any special-purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer-readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special-purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid-state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system and method for geomodelling and pathfinding. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A runtime pathfinding method for determining the shortest path between a start point and end point in a geo grid of level-n comprised of cells, comprising the steps of:

(a) determining, at runtime, a first child level cell associated with the start point;
(b) determining, at runtime, a second child level cell associated with the end point;
(c) determining, at runtime a first shortest path between the first child level cell associated with the start point and a first parent cell edge nearest to the start point;
(d) determining, at runtime a second shortest path between the second child level cell and a second parent cell edge nearest to the end point;
(e) extracting a pre-computed and cached shortest path between the first nearest parent cell edge and the second nearest parent cell edge;
(f) constructing, at runtime, the shortest path between the start point and the end point by adding cell paths obtained in (c), (d) and (e); and
(g) outputting the constructed shortest path between the start point and the end point.

2. The method of claim 1, wherein the step of outputting the constructed shortest path comprises rendering, via heatmaps and vector fields, the constructed shortest path.

3. The method of claim 1, wherein the start point and end point are any of the following: people, item, or structure.

4. The method of claim 1, wherein the method further comprises mapping of an area onto the geo grid of level-n by:
(a) forming the level-n grid covering the area, where n>2, the forming comprising:
(1) assigning a plurality of level-1 cells to cover the area, each level-1 cell in the grid indexed by a geohash of length 1;
(2) assigning a plurality of level-2 (child) cells to cover each level-1 (parent) cell, each level-2 cell indexed by another geohash of length 2, and assigning a plurality of level-3 cells to cover each level-2 cell, each level-3 cell indexed by yet another geohash of length 3,
wherein assigning in (2) is repeated, when necessary, until a level-n grid is formed;
(b) storing map information associated with each geohash in the level-n grid; and
(c) storing non-map information associated with each geohash in the level-n grid.

5. The method of claim 4, wherein non-map data comprises indoor and outdoor structural data.

6. The method of claim 4, wherein the indoor structural data comprises any of the following structural elements: walls, floors, and racks.

7. The method of claim 4, wherein the outdoor structural data comprises any of the following structural elements: houses, commercial buildings, bridges, railways, and underground passages.

8. The method of claim 4, wherein a string length of each geohash represents its level.

9. The method of claim 4, wherein the plurality of level-1 cells comprises 32 level-1 cells and the plurality of level-2 cells comprises 32 level-2 cells.

10. The method of claim 4, wherein each geohash contains height or floor indication.

11. The method of claim 4, wherein the stored map information associated with each geohash is any of, or a combination of, the following: a longitude and a latitude.

12. The method of claim 4, wherein the stored non-map information associated with each geohash is any of, or a combination of, the following: structure data, people data, number of persons at a location at a given time, weather, and an item.

13. The method of claim 12, wherein data associated with the stored non-map information is static or temporal.

14. The method of claim 12, wherein the item is any of the following: merchandise, machinery, Internet of Thing (IoT) based device, or sensor.

15. A system comprising:
(a) a first database storing first data mapping an area onto a level-n grid, where n>2, the level-n grid formed by (1) assigning a plurality of level-1 cells to cover the area, each level-1 cell in the grid indexed by a geohash of length 1; (2) assigning a plurality of level-2 cells to cover each level-1 cell, each level-2 cell indexed by another geohash of length 2, and assigning a plurality of level-3 cells to cover each level-2 cell, each level-3 cell indexed by yet another geohash of length 3, wherein assigning in (2) is repeated, when necessary, until a level-n grid is formed;
(b) a second database storing map information associated with each geohash in the level-n grid;
(c) a third database storing non-map information associated with each geohash in the level-n grid; and
(d) a fourth database storing cached shortest paths between parent cell edges in the level-n grid.

16. The system of claim 15, wherein the system further comprises an application configured to implement a graphical user interface that renders multiple levels of the level-n grid.

17. The system of claim 15, wherein the system further comprises an application configured to compute a shortest path between a start point and end point in the level-n grid, and configured to render the computed shorted path via heatmaps and vector fields.

* * * * *